United States Patent
Fischer

(10) Patent No.: US 7,537,039 B2
(45) Date of Patent: May 26, 2009

(54) WINDOW BLIND DRIVEN BY A WINDOW LIFTER

(75) Inventor: Erik Fischer, Stuttgart (DE)

(73) Assignee: BOS GmbH & Co. KG, Ostifildern (DE)

( * ) Notice: Subject to any disclaimer, the term of this patent is extended or adjusted under 35 U.S.C. 154(b) by 71 days.

(21) Appl. No.: 11/891,275

(22) Filed: Aug. 9, 2007

(65) Prior Publication Data

US 2008/0034668 A1 Feb. 14, 2008

(30) Foreign Application Priority Data

Aug. 10, 2006 (DE) .................. 10 2006 037 594

(51) Int. Cl.
*A47G 5/02* (2006.01)
(52) U.S. Cl. .................. 160/98; 160/87; 160/89; 160/90
(58) Field of Classification Search .................. 49/61, 49/62, 63, 65, 348, 349, 352, 502; 160/87, 160/89, 90, 98, 99, 100, 102; 296/97.1, 97.4, 296/91.11, 97.8, 97.9
See application file for complete search history.

(56) References Cited

U.S. PATENT DOCUMENTS

| | | | | |
|---|---|---|---|---|
| 2,434,559 A | * | 1/1948 | Garcia | 160/37 |
| 2,591,232 A | * | 4/1952 | Brown | 160/90 |
| 4,331,359 A | * | 5/1982 | Sheldon | 296/146.2 |
| 4,773,697 A | * | 9/1988 | Svensson | 296/152 |
| 5,165,188 A | * | 11/1992 | Tsiros | 49/63 |
| 5,562,144 A | * | 10/1996 | Ming-Shun | 160/370.22 |
| 6,523,880 B1 | * | 2/2003 | Yako | 296/97.1 |
| 6,840,562 B2 | * | 1/2005 | Schlecht et al. | 296/97.9 |

FOREIGN PATENT DOCUMENTS

| | | | |
|---|---|---|---|
| CH | 675707 A5 | * | 10/1990 |
| DE | 20 2004 009 874 A1 | | 9/2004 |
| DE | 20 2004 014 652 U1 | | 3/2006 |
| EP | 1 262 349 A2 | | 10/2002 |

\* cited by examiner

*Primary Examiner*—Jerry Redman
(74) *Attorney, Agent, or Firm*—Leydig, Voit & Mayer, Ltd.

(57) ABSTRACT

A window blind for motor vehicle doors including a winding shaft arranged underneath the window's lower edge is provided. One edge of the blind sheet is fastened to the winding shaft and its other edge is attached to a pull bar. The pull bar is connected to at least one support rod that is arranged approximately at a right angle to the pull bar and projects into the body of the door. The support rod is guided in the door body and it is provided at its inner end with a dog. The dog is designed to cooperate with a dog driven by the window lifter, so that the window blind is also opened semiautomatically when the window is opened.

24 Claims, 4 Drawing Sheets

WINDOW BLIND DRIVEN BY A WINDOW LIFTER

FIELD OF THE INVENTION

The present invention relates generally to blinds for windows of motor vehicles.

BACKGROUND OF THE INVENTION

Window blinds can be used to shade the interior of a passenger vehicle. A distinction between manually operated window blinds and electrically operated window blinds is that manual window blinds have a winding shaft rotatably seated in the window body underneath the lower edge of the window. One end of the blind material or sheet is fastened to the winding shaft. The other end of the blind sheet is remote from and extends parallel to the winding shaft and is fastened to a pull bar. The winding shaft is biased by a spring motor in the direction in which the blind sheet winds onto the winding shaft.

The pull bar has a handle that can be gripped manually. When pulling the blind out, the handle is gripped and moved towards the upper edge of the window. This pulls the blind sheet off the winding shaft against the force of the spring motor. In the uppermost position, the pull bar, handle or a special hook is hung on a fixture situated on the window frame in order to keep the window blind stretched out in front of the window.

To retract the window blind sheet, the handle again must be gripped in order to unhook the rod from the suspension device and guide it by hand to the lower edge of the window. The window blind sheet is simultaneously wound onto the winding shaft. The blind sheet runs through a slot between the window pane and parts of the inside trim of the vehicle door.

Manual operation of the blind sheet is not always compatible with modern electrically operated vehicle windows. While it is possible to open the window electrically when the blind sheet is extended, the blind sheet can begin to flutter because it is subjected to the air flowing past on the outside. In such a case, there is a substantial risk of damaging the window blind.

Once the window has been opened it is also not easy to wind the window blind sheet onto the winding shaft in a controlled manner. Depending on the pressure conditions around the vehicle body, the air flowing past the vehicle can tend to either draw the window blind sheet to the outside of the vehicle or to push it into the vehicle's interior. When the blind sheet is pushed into the interior of the vehicle it can lead to a considerable balloon effect that can make retraction of the window blind sheet difficult. In particular, the force created by the air can be greater than the force that the spring motor can exert causing a large balloon to be created as the pull bar is guided downwards, without any of the window blind sheet being wound onto the winding shaft.

In addition to these known manual window blinds, an electrically operated window blind is disclosed in DE 100 05 970 A1. Two guides are provided in the body of the vehicle door in which flexible support rods run perpendicular to the lower edge of the window. These support rods serve to stretch out a blind sheet which is connected to a winding shaft. The winding shaft is, in turn, rotatably seated underneath the lower edge of the window and biased by an electric motor in the direction in which the blind sheet is wound up on the winding shaft. The two support rods, which move the blind sheet while guiding it in a direction perpendicular to the window pane, act on the free edge of the blind sheet, i.e., the edge that travels the furthest in the stretching-open direction. In this manner, lateral guide rails are not required. It is therefore particularly suitable for those vehicle doors in which the window has no lateral and upper frame, as is common for coupes, for instance.

The two support rods are driven by linear flexible drive members that have teeth around their outer surface. The drive members mesh with a gearwheel seated on the output shaft of a geared motor. The support rods are advanced or retracted by setting the geared motor in motion. When advancing, the support rods carry the blind sheet and tension it in front of the window pane against the force of the spring motor. If the drive motor is operated in the opposite direction, the support rods are retracted and the spring motor is allowed to wind the blind sheet onto the winding shaft.

The cost of such an automatically operated window blind is relatively high compared to a manual window blind because an additional electric motor is required. Moreover, additional wiring and an additional operating switch are also required in the vehicle further adding to the expense.

OBJECTS AND SUMMARY OF THE INVENTION

Based on the foregoing, a general object of the present invention is to provide a semiautomatic window blind.

To this end, a window blind is provided that can be housed in the body of a vehicle door. The vehicle door body can have an upper body edge, underneath which the winding shaft of the window blind is rotatably supported. A spring motor, which can be situated outside or inside the winding shaft, is connected to the winding shaft. The spring motor rotates the winding shaft in the wind up direction relative to the blind sheet connected to the winding shaft. At the end of the blind sheet remote from the winding shaft, a pull bar is provided to enable manual operation.

In addition to the blind sheet, the vehicle door includes a window pane that is movably guided via a guide device in a direction perpendicular to the upper body edge. The guide device typically consists of two guide rails that run parallel to one another. Depending on the design of the door, the guide rails are confined to the body, or if the door has a frame, they extend out of the body into the frame.

The window pane has two lateral edges that are parallel to each other at least in certain sections so as to allow the window pane to be guided in the guide rails. A lower edge of the window pane, which may either be freely accessible or furnished with a reinforcing or protective rail, extends transverse to the two lateral edges. A window lifter acts on this lower edge of the window pane, either directly or through the protective rail. The window lifter is electrically operated and is composed of a geared motor and a cable unit. In this manner, the window, which is positively engaged at one or more mutually separated points in the area of the lower edge, can be moved in a tilt-free manner in both directions parallel to the guide rails.

In order to hold the blind sheet in each intermediate opened position, at least one support rod is provided which is arranged in a guide such that it is longitudinally movable. The guide is mounted inside the body and in certain sections of the support rod the guide can protrude outward through the body. The support rod not only to transfers compressive forces, but also is sufficiently rigid to keep the pull bar pressed against the window pane. A brake unit is also associated with the guide device. The brake unit has sufficient braking power to prevent the spring motor from overcoming the brake.

To advance the window blind, the pull bar can be grasped by hand and guided towards the upper end of the motor vehicle window. At the same time, the support rod, which is connected to the pull bar so as to resist tensile and compressive force, is pulled out of the body. When the pull bar is released, the blind sheet remains stationary in the particular position due to the interaction of the support rod and the brake unit, and tensions the pull bar elastically against the inside of the window pane. For retraction, the pull bar can be manually moved towards the body edge. The force of the brake unit must be overcome manually. The spring motor simultaneously winds the blind sheet onto the winding shaft.

The arrangement of the present invention is semiautomatic in the sense that when the window pane is moved into the door body (i.e., when the window is opened), the support rod is necessarily moved back into the body so that the upper edge of the blind sheet approaches the upper edge of the body synchronously with the lowering of the window pane. This ensures that the blind sheet is always effectively protected by the window pane against the prevailing wind blast on the outside of the window pane.

The geared motor of the window lifter is used to achieve the semiautomatic movement. A gear wheel driven by a positively engaging linear drive member is mounted on the output shaft of the geared motor. The drive member leads to a guide housing arranged alongside the support rod. Inside the guide housing, the drive member is connected, in a manner resistant to tension and compression, to a dog projecting from the guide housing. The dog projects into the movement path of a second dog provided on the support rod. Due to this arrangement, the window blind can be pulled out or retracted manually at any time, because the first dog is in an upper end position, in which it does not hinder the movement of the second dog. When the window is being opened, the first dog is brought from the upper end position into a lower end position. If the window blind was deployed, the second dog is engaged and forcibly moved downward in a positively engaging manner. Accordingly, the window blind can be rolled up on the winding shaft. The operation thus takes place semiautomatically.

The door can have a body with an outer surface covered with sheet metal and an inner surface covered by an interior trim panel. The body can optionally also include an intermediate wall on which; for instance, the electric motor of the window lifter can be mounted.

An additional advantage of the present invention is that an additional drive motor for retracting the blind sheet is not necessary. The need to provide additional wiring and an operating switch is therefore eliminated. With an appropriate design, a window blind according to the invention is not significantly more expensive than a completely manual window blind. On the other hand, the semiautomatic operation protects the blind sheet from damage by a blast of wind.

The upper edge of the body can be the upper edge of the door for a frameless window. In the case of a window with a frame, the upper edge of the body can also be the lower edge of the window.

The window pane can be flat or curved about an axis parallel to the vehicle's longitudinal axis.

In the case of a frameless window, the guide rails are located only inside the body and do not project above the body. If the window has a frame, the guide rails run above the body edge into the frame.

The window pane can be driven using a typical known drive mechanism, e.g. a geared motor having an output shaft on which a cable pulley is fixed. The cable pulley drives a cable, guided in sections in a sheath, whose two ends are connected to the cable pulley (or which is endless). Inside the body, the cable is guided such that two strands running parallel to one another, which have the same direction of movement, result when the cable is set in motion. The window can thereby be acted upon with one actuation force at two separated points, which avoids jamming in the guide rails.

The winding shaft can be cylindrical if the upper edge of the window extends parallel to the body edge, or it can be slightly conical if the upper edge of the window runs at an incline. If only one support rod is used, a conical winding shaft is easily used. In any case, the winding shaft is arranged hidden inside the body. An appropriate removal slot, through which the blind sheet can be moved to the outside, is provided in the upper edge of the body.

The pull bar expediently runs across the entire width of the respective blind sheet edge so as to stiffen the blind sheet over the entire length of the edge. A handle for manual grasping can be provided on the pull bar in order to facilitate handling. Instead of using only one support rod, two support rods arranged parallel to one another can be used.

If a vehicle door with a window frame is used, the area of the lower window frame can contain grooves into which the pull bar is guided when the window blind is being deployed. These grooves prevent the pull bar from vibrating in the transverse direction of the vehicle thereby eliminating the need to use particularly rigid support rods.

Guide bushings are advantageously used to guide the support rod or rods. These guide bushings can also be constructed as braking units. For this purpose they can be provided, for example, with resilient pressing members that press the support rod against one side of a guide bushing in order to produce the braking power.

In the simplest case, the engaging device can consist of a dog mounted immovably on the support rod and situated with one end in the movement path of the window pane's lower edge. If the window pane is moved downward, the support rod is thus moved downward via the dog. If the window pane is in the closed position, the support rod can be moved up and down as desired. If, on the other hands the window is open and the lower edge of the window is therefore in the lowest position, pulling the support rod out and thus deploying the blind sheet is impossible. A blind sheet that is deployed is moved simultaneously downwards.

The figures and description of preferred embodiments below is limited to an explanation of the aspects necessary for a completed understanding of the invention. It will be clear to those of skill in the art that a number of modifications are possible. Minor details not described can be deduced by a person skilled in the art from the drawings, which supplement the description of figures.

Other objects and advantages of the invention will become apparent upon reading the following detailed description and upon reference to the drawings, in which:

Figure 1:
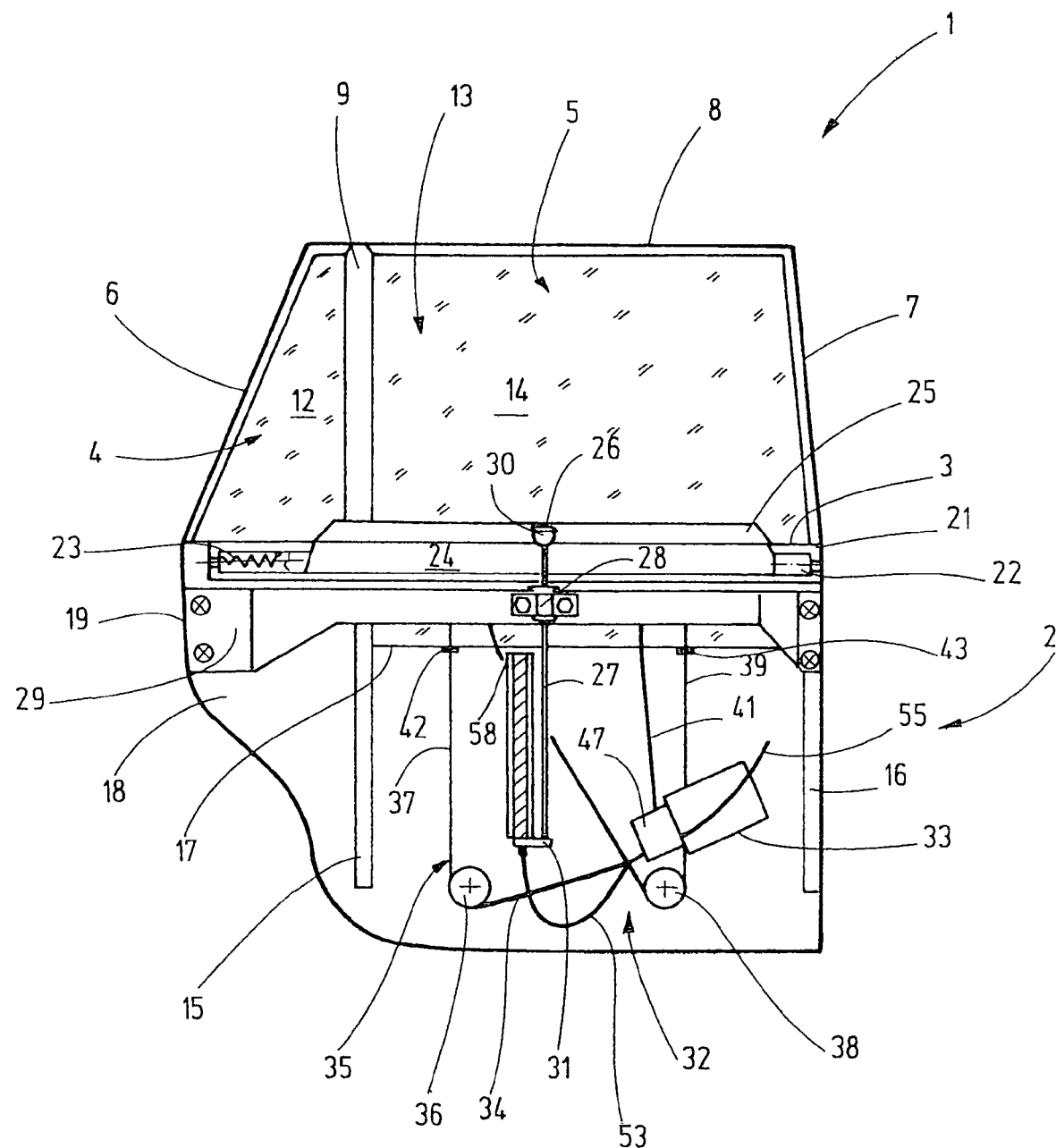
FIG. 1 is a schematic side view of the interior of an illustrative left rear motor vehicle door having a side window blind according to the present invention in a retracted position.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now to FIG. 1 of the drawings, an illustrative motor vehicle door 1 is shown. All parts that are not necessary for understanding the invention are omitted from FIG. 1; however such parts are obviously present in every motor vehicle door. These parts include, for example, the door hinge straps, the fixation device for the door, the lock components for locking the door, air channels, etc. In FIG. 1, the interior trim panel of the door 1 is missing to allow a view into the door's interior.

As shown in FIG. 1, the motor vehicle door 1 includes a body 2, which ends at an upper body edge 3. A window frame 4, which together with the upper body edge 3 delimits a window opening 5, spans the upper body edge 3. The window frame 4 is composed of two frame parts 6 and 7 extending away from the upper body edge, and a transverse frame section 8. The window opening is divided by a vertical bar 9 into two parts, a left, roughly triangular section 11 with a fixed window pane 12 arranged therein, and a section 13 situated at the right relative to the front of the vehicle, with a window pane 14 that is movable up and down. To permit movement of the window pane 14, the vertical bar 9 and the right frame section 6 each have a guide rail 15 that has a guide groove and extends into the body 2. The window pane 14 is dimensioned such that it completely closes off section 13 of the window opening 5 when in a raised position. A lower edge 17 of window pane 14 can be seen inside the body 2 in FIG. 1. The lower pane edge 17 extends parallel to the upper body edge 3.

In a familiar manner, the body 2 generally has a shell-like shape and has an outer sheet metal skin 18 and a peripheral side wall 19. The side wall 19 is appropriately contoured and has a variable height, depending on the vehicle body shape.

In the body 2, a type of cartridge 21 in which a winding shaft 22 is rotatably seated is arranged beneath the upper body edge 3. The winding shaft 22 extends parallel to the upper body edge 3, and thus also parallel to the upper frame edge 8. As shown in the cutaway section on the left side of winding shaft 22, a spring motor 23 is seated in the winding shaft 22. One end of the spring motor is connected to the body 2 so it cannot rotate and the inner end of which is anchored on the tubular winding shaft 22. With the aid of the spring motor 23, which in this case comprises a helical tension spring, the winding shaft 22 is biased in a direction of rotation. A number of suitable types of spring motor 23 are well-known from the state of the art. Since the specific type of spring motor 23 is of no consequence for the present invention, only a schematic representation is provided. A blind sheet 24 is fastened at one edge to winding shaft 22. The edge of the blind sheet 24 that is remote from the winding shaft 22 is attached to a pull bar 25 that carries a handle 26 roughly in the center.

The window blind described to this point is free from guide rails. In order to keep the blind sheet 24 in the unrolled state, a support and guide rod 27 is provided. The support or guide rod 27 is a cylindrical or profiled rod of small diameter that is sufficiently rigid relative to flexing to control the forces arising during normal handling without excessive bending.

In order to guide the support rod 27, a guide bushing 28, which also serves as a brake mechanism, is arranged below the winding shaft 22 in the body 2. The guide bushing 28 is mounted on a cross beam 29 that extends underneath the cartridge 21 over the width of the body 2. The support rod 27 is guided with the aid of this guide bushing 28 in a direction perpendicular to the upper body edge 3. With appropriate spring members in the guide bushing 28, a frictional or braking force is produced which ensures that it is difficult to displace the support rod 27 in the guide bushing 28. As shown in FIG. 1, the end 30 of the support rod 27 projecting from the body 2 is connected to pull bar 25 directly below the handle 26. A dog 31 pointing to the side is mounted on the inner end of the support rod 27. The functional length of the support rod 27 is apparent from the following description of its operation.

For operating the window pane 14, a window lifter 32 is provided. The window lifter 32 includes a geared motor 33, which drives, via a cable pulley, a cable 35 guided in certain sections in sheaths 34. The cable 35 can be an endless cable that runs in several loops around a cable pulley, or it can be a cable whose ends are fixed to the cable pulley. From the geared motor 33, the cable 35 runs to a first guide roller 36, which is rotatably arranged below the lower end of the guide rails 15 and 16. The shaft of the first guide roller 36 is perpendicular to the plane defined by window pane 14 and is rotatably seated on support structures inside the body. The cable section between the first guide roller 36 and the geared motor 33 runs in a sheath.

Downstream of the guide roller 36, the cable 35 forms a cable strand 37 that runs parallel to the guide rail 15 in the direction of the upper body edge 3. Just below the upper body edge 3 there is another cable pulley, covered by cross beam 29 and cartridge 21, at which the cable 35 is deflected towards a deflection pulley 38. The cable section between the cable pulley 38 and the cable pulley below the upper body edge 3 again runs in a sheath.

Downstream of the cable pulley 38, the cable 35 again forms a cable strand 39 that extends upward parallel to the cable strand 37 (and thus parallel to the guide rails 15 and 16) to the upper body edge 3. The cable pulley 38 is functionally at the same height as the guide roller 36, and is also axially parallel to it. There is an additional cable pulley that is axially parallel to the deflection pulley that is covered by the cross beam 29 and is downstream of the cable strand 37. The cable strand 39 terminates at this additional cable pulley in order to be led back from there in a sheath section 41 to the geared motor 33.

The described running of the cable 35 results in two cable strands 37 and 39 that move parallel to one another in the same direction when the geared motor 33 is set in motion. The dogs 42 and 43, which connect cable strands 37 and 39, respectively, to lower pane edge 17, in a manner resistant to tension and pressure, are situated on the two cable strands 37 and 39.

Figure 4:
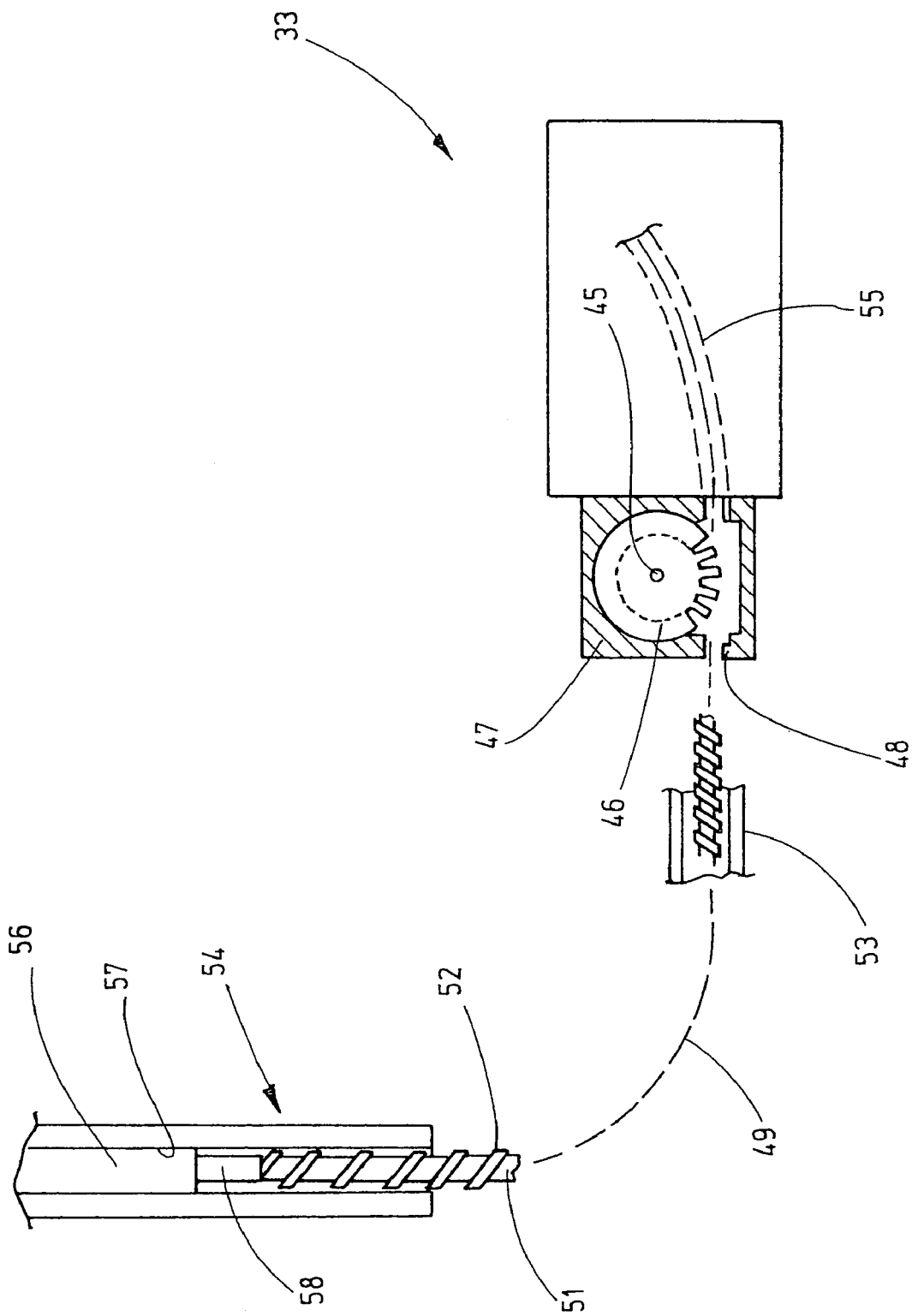
FIG. 4 is a partially cut away schematic side view of the drive motor of the window lifter and a part of the coupling mechanism for moving the window blind of the motor vehicle door of FIG. 1.

The geared motor 33 of the window lifter 32 is also used for the semiautomatic operation of the window blind. Referring to FIG. 4 of the drawings, the geared motor 33 is shown in a partially cutaway view in which an output shaft 45 can be seen on which a co-rotating front gear wheel 46 is mounted. The output shaft also drives a cable pulley for the cable 35. A gear wheel 46 is situated in a gear or transmission casing 47, through which a bore 48 extends tangentially past a gear wheel 46. The gear wheel 46 positively actuates a linear, pressure resistant and flexible drive member 49. The flexible drive member 49 comprises a flexible core 51 and a helix 52 fixed on the core. The helix 52 is firmly connected to core 51 resulting in a kind of completely interlocked flexible rack with helical gearing. The pitch of the helix 42 corresponds to the pitch of the gear wheel 46, so that its teeth are able to engage positively in the gaps between the helix 57 in order to move the drive member 49 in both directions.

A sheath 53 extends from the side of the transmission case 47 remote from the motor to a straight elongated guide housing 54 that is arranged laterally alongside and parallel to the support rod 27 as shown in FIG. 1. Its functional length corresponds to the functional length of the support rod 27. Extending From the opposite side of the transmission casing 47, a storage tube 55 that leads away from the bore 48 holds the unneeded part of the drive member 49 in the given operating position. The guide housing 54 contains an undercut groove 56 extending over its entire length and opening outward in a slot 57. The drive member 49 is guided inside this undercut groove 56, secured against bending such that it can transfer tensile and compressive forces. The slot 57 is dimensioned such that the drive member 49 cannot escape from the housing 54.

Inside the guide housing 54, the drive member 49 carries a dog 58, in a manner resistant to tension and pressure, that projects to the outside through slot 57. The dog 58 lies within the clearance profile of the movement of the dog 31, so that they can engage with one another. The dog 58 is situated above dog 31. Thus, only a force directed downward can be transferred to the dog 31 by the dog 58, not one in the reverse direction. As a result of the described arrangement, the dog 58 moves in the same direction as the cable strands 37 and 39, and thus in the same direction as the window pane 14. Their rates of motion are likewise identical.

The described parts in the body 2 are arranged in layers. The cable strands 37 and 39, as well as the intervening cable section that runs between the cable pulleys 36 and 38, and the corresponding cable pulleys covered by the crossbeam 39, lie closest to the outer sheet metal skin 18. The window pane 14 is further from the sheet metal skin 18 (i.e., the cable strands 37, 39 are situated in the gap between the outside sheet metal skin 18 and the window pane 14). The crossbeam 29 with the guide bushing 28 mounted thereon is the furthest from the outer sheet metal skin 18. The winding shaft 22 and the blind sheet 24 also lie between the support rod 27 and the window pane 14. The dog 31 points, as the figure suggests, in the direction of sheet metal skin 18 (i.e. outward) and it protrudes, in a section 44, into the clear space profile of the movement path of the lower pane edge 17. The geared motor 23 is likewise situated in the gap between the window pane 14 and the sheet metal outer skin 18. The sheath 53 likewise leads underneath the lowered window pane 14 on its inner side to the lower end of the guide housing.

The internal structure of the motor vehicle door 1 as described is closed off from the vehicle interior by an interior trim panel. The interior trim panel together with the body 2 at its upper edge forms a slot through which blind sheet 24 can be pulled out. In addition, there is an opening through which the support rod 27 can move into the interior of the body.

The description of the operation of the illustrated embodiment is based on a starting position as shown in FIG. 1. In FIG. 1, the window is closed, i.e. the window pane 14 is in the raised state where its upper edge penetrates into the groove of the frame section 8. The window pane is held in this position by the window lifter. The geared motor 33 is self-locking and thus locks the position of the dogs 42 and 43. Even the vibrations resulting from driving are not able to move the window pane 14 downward. In its final upper position, the dog 58 is situated downstream of the cross beam 29. The blind sheet 24 of the window blind is rolled up onto the winding shaft 22 by the force of the spring motor 23. The support rod 27 is pushed as far as possible into the body 2.

Figure 2:
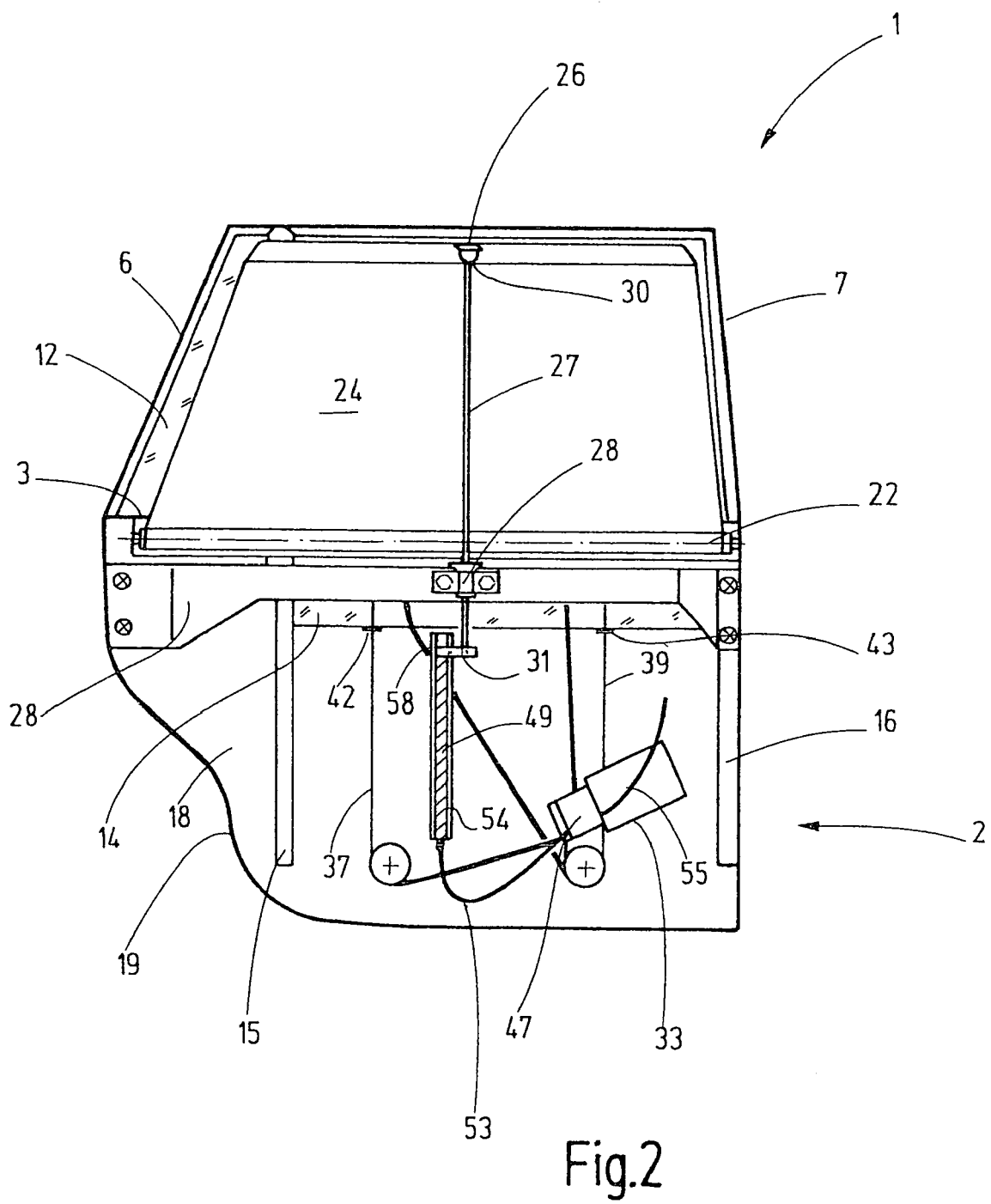
FIG. 2 is a schematic side view of the motor vehicle door of FIG. 1 with the side window blind in a deployed position and the window closed.

Starting from the position shown in FIG. 1, the blind sheet can be stretched out in front of the window opening. To this end, the user grasps the handle 26 and moves it upward in the direction of the frame section 8. At the end of the extension, the pull bar 25 extends just below the lower edge of the frame section 8, as shown in FIG. 2. The blind sheet 24 almost completely covers the window opening 5, more particularly, the blind sheet covers both section 11 and section 12 of the window. In this case, the blind sheet 25 is approximately trapezoidal in shape. The dog 31 almost rests against the dog 58, which also defines its position. In this position, the dog 58 does not obstruct the movement of support rod 27.

As a result of the braking action of guide bushing 28, the blind sheet 25 remains stretched open. The braking action is sufficiently strong that the spring motor 23 cannot, either alone or in combination with any vehicle vibrations, overcome the braking force or cause the pull bar 27 to slip back into the body 2.

In order to again retract the blind sheet, the user must grasp the handle 26 and forcibly press the support rod 27 back into body 2. The blind sheet 24 is simultaneously rolled up by the spring motor 23.

In order to prevent the window blind from being inadvertently deployed with a window open (i.e., with the window pane 14 lowered) and damaged by the wind, semiautomatic operation is possible.

Figure 3:
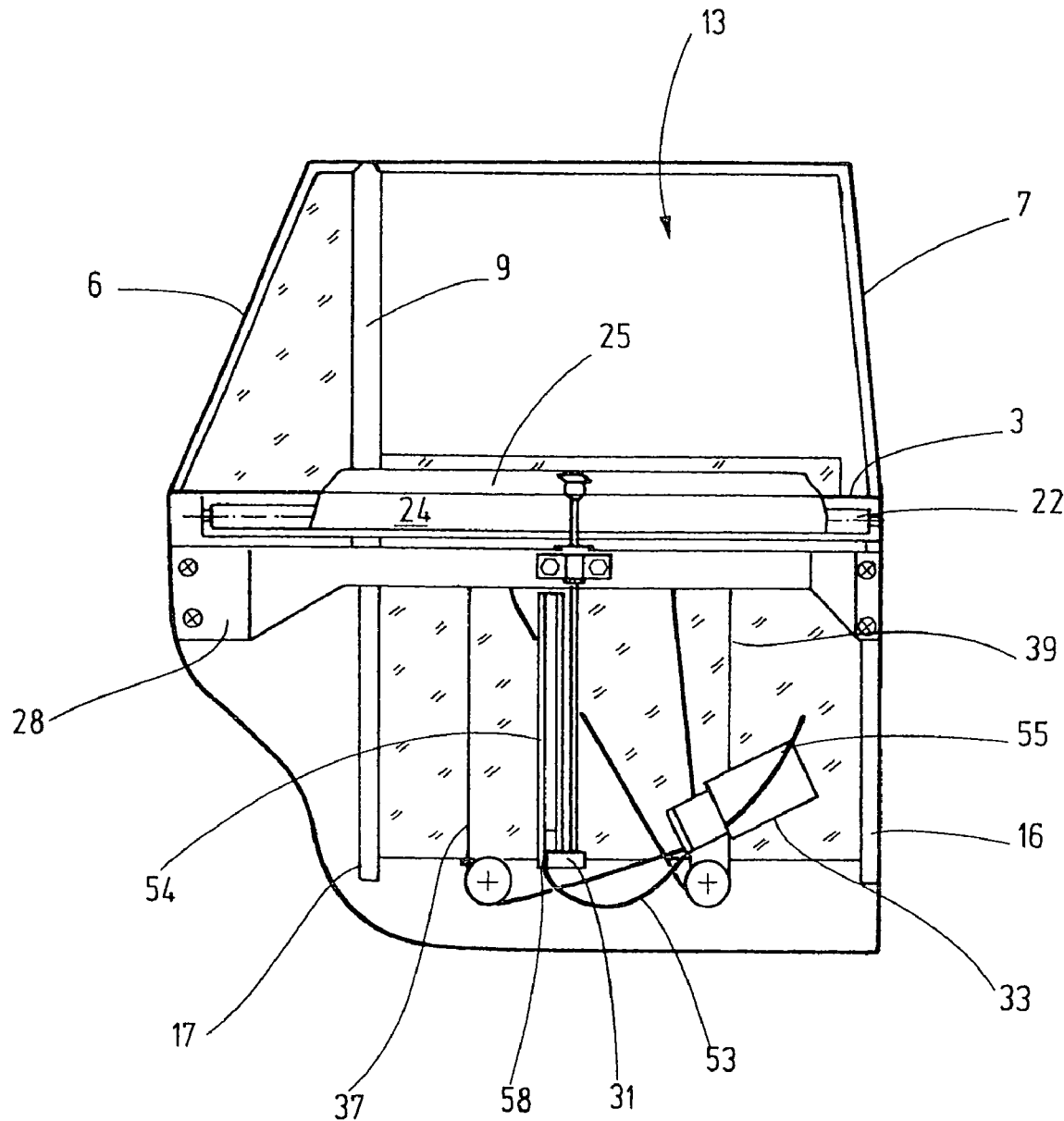
FIG. 3 is a schematic side view of the motor vehicle door of FIG. 1 with the side window opened.

As shown in FIG. 2, the dog 31 is situated directly under the dog 58 when the blind sheet 24 is deployed. The dog 31 projects into the clearance area of dog 58. If the geared motor 33 is set in motion from the position shown in FIG. 2 in order to open the window, the window pane 14 is pulled downward into the body 2 by the cable strands 37 and 39. During this movement, the geared motor 33 also drives the drive member 49 synchronously, whereby the dog 58 is moved downward at the same speed as the pane 14. In the process, the downward-moving dog 58 engages the dog 31, with which it cooperates in a form fitting manner. The cooperation between the dogs 31 and 58 ensures that the support rod 27 is also pulled into the body 2, so that ultimately the same movement results as when the user presses the support rod 27 downward at the handle 26. The end of this movement is shown in FIG. 3. The pane 14 is completely lowered, i.e. the window is opened completely and the blind sheet 24 is again in the position shown in FIG. 1, i.e. the window blind is likewise opened.

As is evident the foregoing explanation, the window blind of the present invention is a semiautomatic window blind that can be opened and closed manually as desired. The coupling mechanism between the window pane and the window blind ensures that the window blind is automatically retracted whenever window pane 14 is lowered. This automatic retraction is powered by the window lifter. Thus, it is easy to protect the window blind from a wind blast. On the other hand, if desired, the driver can easily open the manually operable window blind simply by operating the window lifter for the respective window.

Since the support rod 27 must also press the pull bar 25 against the window pane 14 in order to prevent rattles, it can be advantageous if the guide bushing 28 is not mounted completely rigidly, but is pivotable under spring tension to a limited extent about an axis parallel to upper the body edge 3.

As is further evident from the description of figures, the two dogs 31 and 58 form a coupling mechanism that is active in only one direction for moving the support rod 27 downwards along with the movement of the window pane 14 in the opening direction and thus retracting the window blind.

The illustrated arrangement having only one support rod 27 can also be used for windows in which the upper framework section 8 runs at an acute angle to the upper body edge 3, and thus to the lower window edge. In such a case, the winding shaft 22 is not cylindrical but slightly conical, in order to obtain the necessary pivoting motion of the pull bar 25 during the retraction and extension. In this case, the connection between the support rod 27 and the pull bar 25 is arranged in such a way that the pivoting movement is not hindered by the support rod 27.

The present invention has been described in connection with a motor vehicle door 1 in which the door window has a frame. Frameless windows are also well-known in automobile construction. Such windows are used particularly in coupes. As will be apparent to those skilled in the art, the described construction is also suitable for frameless windows, since the function of the window blind does not depend on whether window framework 4 is present.

A window blind for motor vehicle doors including a winding shaft arranged underneath the window's lower edge is provided. One edge of the blind sheet is fastened to the winding shaft and its other edge is attached to a pull bar. The pull bar is connected to at least one support rod that is arranged approximately at a right angle to the pull bar and projects into the body of the door. The support rod is guided in the door body and it is provided at its inner end with a dog. The dog is designed to cooperate with a dog driven by the window lifter, so that the window blind is also opened semiautomatically when the window is opened.

The invention claimed is:

1. A motor vehicle door comprising:
a body having an upper body edge that extends substantially horizontal relative to an operating position;
at least one window pane having two mutually parallel lateral edge sections;
guide elements provided on the body and in which the window pane is guided at its lateral edge sections substantially perpendicular to the upper body edge;
an electric window lifter for moving the window pane up and down in the guide devices, the window lifter including a geared motor with an output shaft and at least one drive member that is driven by the geared motor and is operatively coupled to the lower edge of the window pane;
a winding shaft rotatably seated below the upper body edge in the body;
a blind sheet having a shape similar to that of the windowpane, a first edge of the blind sheet being fastened to the winding shaft and a second opposite edge of the blind sheet being connected to a pull bar for manually operating of the blind sheet;
a spring motor coupled to the winding shaft for biasing the winding shaft in a direction for rolling up the blind sheet on the winding shaft;
at least one support rod that is rigid to flexing in relation to its use, the support rod being movably guided in the body substantially at a right angle to the upper body edge, the support rod being connected, in a manner resistant to tension and compression, at an outer end to the pull bar, and having an inner end that during operation remains inside the body;
a brake mechanism for the support rod, the brake mechanism producing a braking sufficient to prevent the spring motor from moving the support rod;
a gear wheel mounted on and rotating integrally with the output shaft of the geared motor;
a second drive member positively coupled to the gear wheel; and
a coupling mechanism that acts in only one direction operatively arranged between the second drive member and the support rod in such a manner that when the window pane is in an upper position the blind sheet is manually movable up and down at any time while simultaneously engaging the support rod, and such that the extended support rod is necessarily moved downward with the window pane when the window pane is moved downward by the window lifter.

2. A vehicle door according to claim 1, wherein the body includes an exterior sheet metal skin and an interior trim panel.

3. A vehicle door according to claim 1, wherein the body includes hinges for attaching the body to a vehicle body.

4. A vehicle door according to claim 1, wherein the upper body edge forms the door upper edge for a frameless window.

5. A vehicle door according to claim 4, wherein the guide elements comprise guide rails that extend only in the body.

6. A vehicle door according to claim 1, wherein the upper body edge forms the lower window edge for a motor vehicle door with a window frame.

7. A vehicle door according to claim 6, wherein the guide elements comprise guide rails that extend in the body and in a window frame provided on the body.

8. A vehicle door according to claim 1, wherein the window pane is curved relative to a horizontal axis.

9. A vehicle door according to claim 1, wherein a cable pulley is mounted on the output shaft of the geared motor of the window lifter.

10. A vehicle door according to claim 1, wherein the electric window lifter comprises a cable mechanism that is connected to the window pane or to a rail fastened to the lower edge of the window pane.

11. A vehicle door according to claim 1, wherein the winding shaft is cylindrical or conical.

12. A vehicle door according to claim 1, wherein the winding shaft is covered in the body.

13. A vehicle door according to claim 1, wherein the blind sheet is formed from a punched film or a knit.

14. A vehicle door according to claim 1, wherein the pull bar extends over the entire length of the second edge of the blind sheet.

15. A vehicle door according to claim 1, wherein the pull bar has a handle for manual grasping.

16. A vehicle door according to claim 1, wherein the spring motor is accommodated in the winding shaft.

17. A vehicle door according to claim 1, wherein the spring motor lies outside of the winding shaft.

18. A vehicle door according to claim 1, wherein a guide bushing is provided in the body for the support rod.

19. A vehicle door according to claim 18, wherein the guide bushing forms the brake mechanism for the support rod.

20. A vehicle door according to claim 19, wherein the guide bushing is arranged below and adjacent to the upper body edge.

21. A vehicle door according to claim 1, wherein a portion of the drive member has circumferential external teeth.

22. A vehicle door according to claim 1, wherein the drive member carries a dog.

23. A vehicle door according to claim 1, wherein the coupling mechanism comprises a dog that is fixed to the support rod and protrudes into the movement path of the dog on the drive member.

24. A vehicle door according to claim 1, further including an oblong guide housing having an oblong slot and in which the second drive member is guided secured against bending.

* * * * *